United States Patent [19]

Mader

[11] Patent Number: 4,913,273
[45] Date of Patent: Apr. 3, 1990

[54] FLUID SHEAR COUPLING APPARATUS HAVING A MODULATING VALVE WITH A MOVABLE APERTURE

[75] Inventor: Gerald E. Mader, Indianapolis, Ind.

[73] Assignee: Household Manufacturing, Inc., Prospect Heights, Ill.

[21] Appl. No.: 246,326

[22] Filed: Sep. 19, 1988

[51] Int. Cl.$^4$ .............................................. F16D 43/25
[52] U.S. Cl. .................... 192/58 B; 192/82 T
[58] Field of Search ............................ 192/58 B, 82 T

[56] References Cited

U.S. PATENT DOCUMENTS

| | | | |
|---|---|---|---|
| 3,174,600 | 3/1965 | Oldberg | 192/82 T |
| 3,463,282 | 8/1969 | Fujita et al. | 192/58 B |
| 3,587,801 | 6/1971 | Riner | 192/58 B |
| 3,642,105 | 2/1972 | Kikuchi | 192/58 B |
| 3,690,428 | 9/1972 | LaFlame | 192/58 B |
| 3,943,893 | 3/1976 | Tsubaki et al. | 192/58 B X |
| 4,036,339 | 7/1977 | Kikuchi | 192/58 B |
| 4,086,987 | 5/1978 | Riley et al. | 192/58 B |
| 4,282,961 | 8/1981 | Roscoe | 192/82 T |
| 4,295,550 | 10/1981 | Hayashi | 192/58 X |
| 4,298,111 | 11/1981 | Hayashi | 192/58 B |
| 4,403,757 | 9/1983 | Shepherd | 192/58 B |
| 4,437,554 | 3/1984 | Haeck | 192/58 B |
| 4,446,952 | 5/1984 | Masai | 192/58 B |
| 4,469,209 | 9/1984 | Hayashi et al. | 192/58 B |
| 4,502,580 | 3/1985 | Clancey | 192/58 B |
| 4,555,004 | 11/1985 | Nakamura et al. | 192/58 B |
| 4,627,524 | 12/1986 | Hayashi et al. | 192/58 B |
| 4,653,624 | 3/1987 | Mader | 192/58 B |
| 4,779,323 | 10/1988 | Bloemendaal | 192/58 B X |

FOREIGN PATENT DOCUMENTS

| | | | |
|---|---|---|---|
| 47-11284 | 4/1972 | Japan | 192/58 B |
| 57-192632 | 11/1982 | Japan | 192/58 B |
| 63-14528 | 9/1988 | Japan | 192/58 B |

Primary Examiner—Leslie A. Braun
Assistant Examiner—David A. Testardi
Attorney, Agent, or Firm—Woodard, Emhardt, Naughton Moriarty & McNett

[57] ABSTRACT

A fluid shear coupling apparatus including a driving member comprising a rotor mounted to a shaft. A driven member including a bearing housing is mounted to the shaft. A complementary surface between the driven member and the driving member is provided between which a shear fluid provides variable coupling according to the proportion of fluid in the reservoir vis-a-vis the fluid shear chamber defined by the complementary surface. A temperature responsive valve is provided to modulate the shear fluid level. The valve may modulate an overlapping inlet having a constant area. An overlap inlet may be define by an arcuate slot or by a fixed size valve aperture. The valve may be pivotable on a valve axis which is eccentric to, and radially outward of, the common axis of the driving and driven members. Temperature responsive rotation of the valve member may be provided by coupling links or by gearing mechanism.

25 Claims, 4 Drawing Sheets

FLUID SHEAR COUPLING APPARATUS HAVING A MODULATING VALVE WITH A MOVABLE APERTURE

BACKGROUND OF THE INVENTION

The present invention relates generally to a fluid shear coupling apparatus, and more specifically to a coupling of this type having a modulating valve.

Fluid shear coupling devices have various applications, and are well-suited, for example, to drive a radiator cooling fan of an internal combustion engine. In order to avoid needless waste of engine energy, fluid shear couplings have been developed which modulate or vary the rotational speed of the cooling fan according to cooling requirements. As temperature increases, the fan speed increases to provide additional cooling. When engine temperature is lower, fan speed is kept lower, thus avoiding wasting energy by driving the fan at speeds higher than are necessary.

This speed modulation is accomplished by varying the level of viscous liquid in the shear coupling. By increasing the amount of liquid providing shear between the rotating input member and the rotating output member (having, for example, a fan thereon), the speed of the output member increases more nearly to the speed of the input member.

One approach to such fluid coupling modulation is disclosed in U.S. Pat. No. 4,502,580 in which a valve member moves with respect to the fluid reservoir cover, exposing a fluid flow opening of varying size with its outermost point moving radially outward and with its outermost edge being oriented at an acute angle relative to a radially extending line. The flow opening is not of a constant area, and the valve member rotates about the common axis of the rotating output member.

Another approach is disclosed in U.S. Pat. No. 4,627,524 which also has a valve member which moves with respect to the fluid reservoir cover. Various discreet openings are located in the reservoir cover, which vary the fluid flow area and the fluid level depending on the location of the valve member. As before, the flow opening is not of a constant area, and the valve member rotates about the common axis of the rotating output member.

Another approach is disclosed in my earlier U.S. Pat. No. 4,653,624. Other related devices are disclosed in U.S. Pat. Nos. 4,403,757, 4,446,952, 4,469,209, 3,463,282, 3,587,801, 3,943,893, 4,295,550, 4,298,111, 4,555,004, 4,086,987, 4,036,339, 3,642,105, and 4,437,554.

The present invention is a significant improvement over these other devices. The present invention provides greater flexibility in shear coupling design, and allows for the sensitivity of modulation to be varied. In addition to variable sensitivity, the present invention allows for greater responsiveness in fluid level for a given temperature change. Furthermore, the present invention allows for a constant fluid inlet flow area while still providing fluid level modulation.

These benefits are realized by a selected arrangment of the valve member with respect to the reservoir cover and by a selected arrangement of the openings in the valve member and the reservoir cover. More specifically, the present invention provides for the valve member to pivot on an axis of rotation which is eccentric to, and radially outward of, the common axis of rotation of the output member housing. Another aspect of the present invention is to have the fluid inlet flow aperture remain a constant size while still providing fluid level modulation and corresponding rotational speed modulation.

SUMMARY OF THE INVENTION

According to one embodiment, the present invention provides a fluid shear coupling apparatus comprising a driving member including a rotor and a shaft connected to the rotor and adapted and configured for transmitting rotational drive from an external drive source to the rotor, the rotor having a first shear surface; a driven member including a second shear surface configured and positioned complementary to the first shear surface of the rotor and defining therewith a fluid shear chamber cooperable with a shear fluid received therein for transmitting torque between the driving member and the driven member; bearing mount means for mounting the driven member to the driving member for relative rotation between the driven member and the driving member about a common axis; a shear fluid reservoir defined by the driven member; a separator wall between the shear fluid reservoir and the fluid shear chamber, the separator wall having a fluid input aperture communicating the shear fluid reservoir with the fluid shear chamber at a first location radially inward of the first and second complementary fluid shear surfaces; fluid return means for returning shear fluid from the fluid shear chamber at a second location radially-outward of the first and second complementary fluid shear surfaces to the shear fluid reservoir; a movable valve member located along the separator wall over the fluid input aperture, the valve member having a valve aperture therein, the valve aperture overlapping the fluid aperture; and means for moving the valve member with respect to the separator wall, wherein movement of the valve member by the means for moving radially displaces the valve aperture with respect to the common axis between a radially inward valve position and a radially outward valve position.

The present invention also provides a fluid shear coupling apparatus comprising: a driving member including a rotor and a shaft connected to the rotor and adapted and configured for transmitting rotational drive from an external drive source to the rotor, the rotor having a first shear surface; a driven member including a second shear surface configured and positioned complementary to the first shear surface of the rotor and defining therewith a fluid shear chamber cooperable with a shear fluid received therein for transmitting torque between the driving member and the driven member; bearing mount means for mounting the driven member to the driving member for relative rotation between the driven member and the driving member about a common axis; a shear fluid reservoir defined by the driven member; a separator wall between the shear fluid reservoir and the fluid shear chamber, the separator wall having a fluid input aperture communicating the shear fluid reservoir with the fluid shear chamber at a first location radially inward of the first and second complementary fluid shear surfaces, the fluid input aperture comprising an arcuate slot having an arcuate inner edge and an arcuate outer edge; fluid return means for returning shear fluid from the fluid shear chamber at a second location radially-outward of the first and second complementary fluid shear surfaces to the shear fluid reservoir; a rotatable valve member located along the separator wall over the fluid input aperture, the valve member having a valve aperture therein, the valve aperture overlapping the fluid input aperture; a valve member pivot on the valve member and located on a valve axis, wherein the valve member is pivotable with respect to the separator wall at the valve member pivot to move the valve aperture along the fluid input aperture radially inward and outward with respect to the common axis, wherein the overlap of the valve aperture and the fluid input aperture define an overlap inlet having a constant area during rotation of the valve member around the valve axis; and means for variably rotating the valve member between a radially inward valve position and a radially outward valve position.

The present invention also provides a fluid shear coupling apparatus comprising: a driving member including a rotor and a shaft connected to the rotor and adapted and configured for transmitting rotational drive from an external drive source to the rotor, the rotor having a first shear surface; a driven member including a second shear surface configured and positioned complementary to the first shear surface of the rotor and defining therewith a fluid shear chamber cooperable with a shear fluid received therein for transmitting torque between the driving member and the driven member; bearing mount means for mounting the driven member to the driving member for relative rotation between the driven member and the driving member about a common axis; a shear fluid reservoir defined by the driven member; a separator wall between the shear fluid reservoir and the fluid shear chamber, the separator wall having a fluid input aperture communicating the shear fluid reservoir with the fluid shear chamber at a first location radially inward of the first and second complementary fluid shear surfaces, the fluid input aperture comprising an arcuate slot having an arcuate inner edge and an arcuate outer edge; fluid return means for returning shear fluid from the fluid shear chamber at a second location radially-outward of the first and second complementary fluid shear surfaces to the shear fluid reservoir; a rotatable valve member located along the separator wall over the fluid aperture, the valve member having a valve aperture therein, the valve aperture overlapping the fluid input aperture; a valve member pivot on the valve member and located on a valve axis, wherein the valve member is pivotable with respect to the separator wall at the valve member pivot to move the valve aperture along the fluid input aperture radially inward and outward with respect to the common axis, wherein the valve axis defines a common radial center for the arcuate inner edge and the arcuate outer edge of the fluid input aperture, wherein the overlap of the valve aperture and the fluid input aperture define an overlap inlet having a constant area during rotation of the valve member around the valve axis; and means for variably rotating the valve member between a radially inward valve position and a radially outward valve position.

An object of the present invention is to provide a fluid shear coupling apparatus having a modulating valve with a movable aperture.

Another object of the present invention is to provide a fluid shear coupling apparatus having a movable aperture of constant cross-sectional area.

Another object of the present invention is to provide a fluid shear coupling apparatus having a movable aperture in a valve body which is rotatable on a pivot which is eccentric to, and radially outward of, the common axis of the coupling apparatus.

Related objects and advantages of the present invention are disclosed in the following description of the preferred embodiment.

DESCRIPTION OF THE PREFERRED EMBODIMENT

Figure 1:
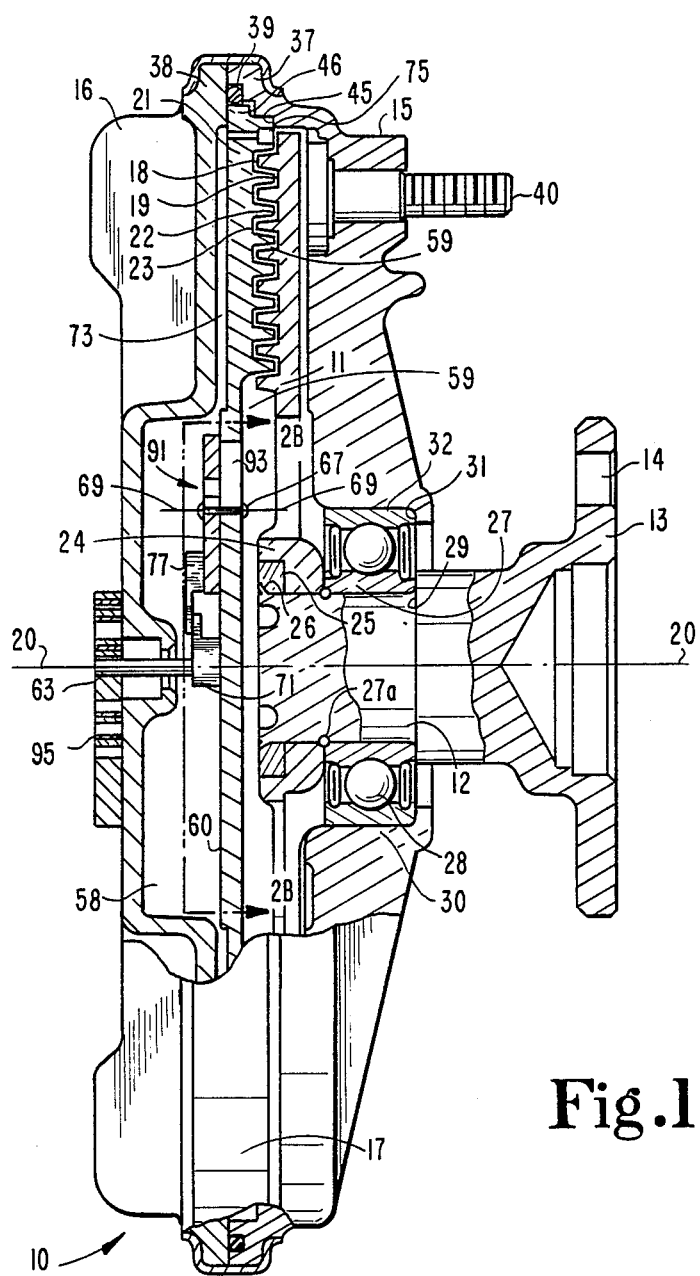
FIG. 1 is a side, partially cross-sectional view of a fluid shear coupling apparatus constructed in accordance with the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring in particular to the drawings, there is shown a fluid shear coupling apparatus 10 constructed in accordance with the present invention. In FIG. 1 there is shown a coupling apparatus in assembled form, with certain of the components shown more specifically in the subsequent figures.

The preferred embodiment generally comprises a driving member connected with an external drive source, and a driven member mounted to the driving member for relative rotation about a common axis 20. The driven member includes a plate 21, a bearing housing 15 and a cover 16 secured together by a metal band 17. The driving member includes a disc-shaped rotor 11 secured to a shaft 12. The shaft includes a mounting portion 13 which is connectable to an external drive source, such as by the reception of bolts (not shown) through apertures 14. A typical external drive source is a vehicle engine for an embodiment in which the apparatus 10 is used as a coupling device for driving a plurality of fan blades mounted to the driven member.

The rotor 11 is shown to have several annular ridges 18 and grooves 19 facing in a first direction parallel to the central common axis 20. The driven member includes a plate 21 mounted to the bearing housing 15 and cover 16. The plate 21 includes several annular ridges 22 and grooves 23 facing in a second axial direction, opposite the first direction. The ridges and grooves of the plate 21 are received adjacent respective grooves and ridges of the rotor 11. These provide spaced, opposed shear surfaces defining a fluid shear chamber therebetween and cooperable with shear fluid in the fluid shear chamber to transmit torque between the rotor and the plate. The close-spaced positioning of the complementary shaped and located ridges and grooves of the rotor and plate provides for varying degrees of coupling between the driving member and the driven member in relation to the amount of fluid received in the intervening shear chamber, as is well understood in the art.

The driven member and driving member are mounted together to have relative rotation about the central common axis 20. The rotor 11 includes an outer, disc-shaped portion which defines the several annular ridges and grooves. The rotor also includes an inner hub portion 24 which is mounted to the shaft 12. Particularly, the hub portion 24 includes a hexagonal steel washer 25 received within a correspondingly shaped hexagonal recess in hub portion 24. Washer 25 includes several radially-spaced depressions which are utilized in staking the shaft to the rotor, as shown, for example, in FIG. 1 at 26.

The bearing housing 15 is bearingly mounted to the shaft 12. The inner race 27 of ball bearings 28 is received between the hub portion 24 of the rotor and a shoulder 29 of the shaft 12, with retaining snap ring 27a being disposed in an annular groove about shaft 12 between hub portion 24 and inner race 27. The bearing housing 15 defines a central hub portion 30 defining a shoulder 31 against which one side of the outer race 32 of the ball bearings is received.

The cover 16 is secured to the bearing housing 15, preferably by means of a magneformed band 17, as disclosed in my U.S. Pat. No. 4,653,624. As shown, the bearing housing and cover include relatively small and simply configured flanges 37 and 38, respectively, about which the band 17 is received. The bearing housing further defines an annular recess in the flange 37 in which an O-ring 39 is received to provide a seal between the bearing housing and the cover.

As previously indicated, a typical application for the fluid shear coupling apparatus of the present invention is for providing a fan drive in respect to a vehicle engine. In this regard, the bearing housing 15 is provided with several apertures through which bolts, such as bolts 40, are received.

As shown in FIG. 1, the bearing housing 15 includes an annular recess 45 in which is received the outer, perimetric edge of the plate 21. The plate is thereby clamped between the bearing housing 15 and the cover 16 when those components are secured together by means of the band 17. Plate 21 is also provided with projections 46 which are received within corresponding recesses in the bearing housing to operate as a key to prevent relative rotation of the plate with respect to the cover and bearing housing.

The provision of the plate 21 simplifies the formation of the recirculation passageways through which fluid moves from the fluid shear chamber 59 back to the fluid reservoir. With other designs, it has been necessary to drill and ball the recirculation holes. However, the present construction utilizing the separate cover 16 and plate 21 permits the recirculation passageways to be formed at the time of initial fabrication for these two components. Cover 16 is formed with a pair of radially-extending grooves, such as groove 73. The plate 21 includes a pair of corresponding holes, such as hole 75, extending through the thickness of the plate and communicating with the outermost annular grooves in the plate. Hole 75 is located to align and communicate with the groove 73 upon assembly of the plate 21 to the cover 16. The groove 73 is thereby positioned to define passageways between the plate 21 and cover 16 which communicate with the respective hole 75 and with the central fluid reservoir 58. The holes are positioned at the end of the corresponding annular grooves in the plate such that fluid within the grooves will be forced through the holes, such as hole 75, and radially inward along channels, such as groove 73, to fluid reservoir 58.

Plate 21 includes separator wall 60. Separator wall 60 may be readily separable from plate 21 or homogenous therewith according to the present design. In the preferred embodiment, separator wall is a round, thin metal plate. Separator wall 60 is positioned between shear fluid reservoir 58 and fluid shear chamber 59, providing a barrier against fluid flow therebetween. However, separator wall 60 has a fluid input aperture 93 therein, which in the preferred embodiment, is an arcuate slot (see FIG. 3). Aperture 93 provides an opening through separator wall 60 through which shear fluid in reservoir 58 may flow in a controlled manner into fluid shear chamber 59. As shown in FIG. 3, fluid input aperture 93, as an arcuate slot, has arcuate inner edge 97 and arcuate outer edge 99. Preferably, arcuate edges 97 and 99 are radially disposed around valve pivot 67 located on valve axis 69. Valve axis 69, as illustrated in FIG. 3, defines a common radial center for inner arcuate edge 97 and outer arcuate edge 99. Note that aperture 93 is shown with phantom lines in FIG. 2B.

Valve member pivot 67 pivotably couples valve member 65 to separator wall 60. Valve member 65 is movable with respect to separator wall 60 at pivot 67. As illustrated, valve member 65 is preferably a round, flat plate adjacent to, and in parallel planes with, separator wall 60. Valve member 65 has a valve aperture 91 therein. Valve aperture 91 is a round hole in valve member 65 located radially outward from valve axis 69. As valve member 65 is rotated, valve aperture 91 correspondingly rotates around pivot 67.

Figure 2A:
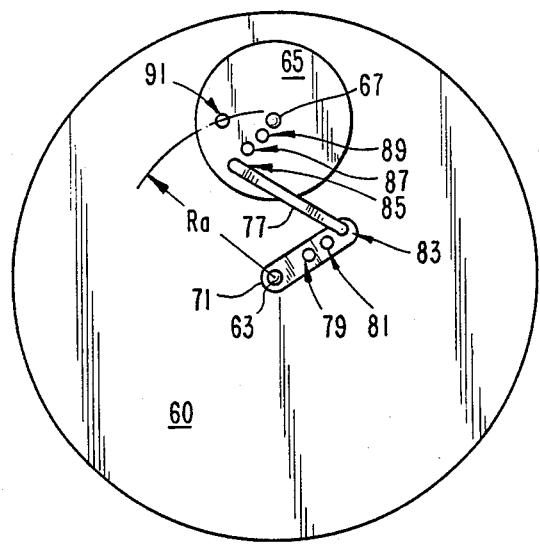
FIG. 2A is a front elevational view of a first embodiment of a separator plate assembly of the apparatus of FIG. 1, with the valve aperture in a first, radially inward position.
Figure 2B:
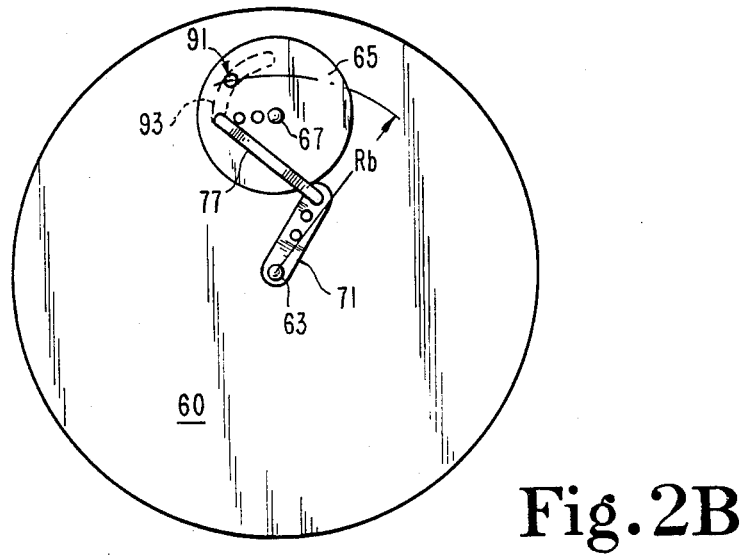
FIG. 2B is a front elevational view of a first embodiment of a separator plate assembly of the apparatus shown in FIG. 1, with the valve aperture in a second, radially intermediate position.
Figure 3:
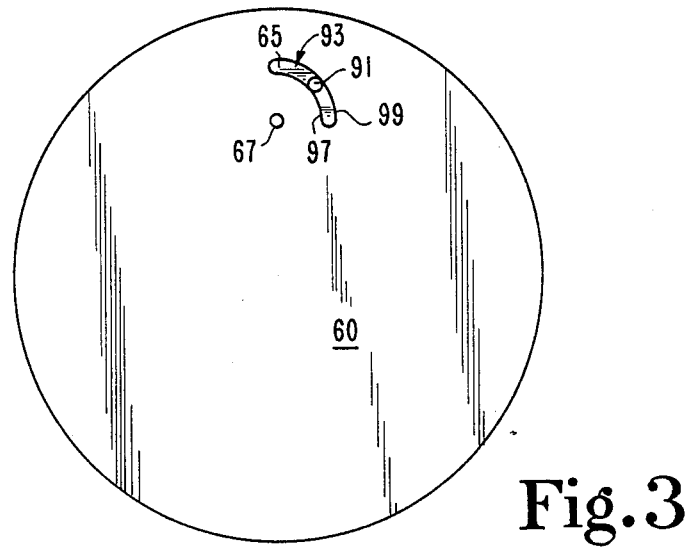
FIG. 3 is a rear elevational view of the separator plate assembly of FIG. 2B.

Valve aperture 91 is positioned and arranged such that it overlaps fluid input aperture 93 (see FIGS. 2b and 3). Accordingly, valve aperture 91 and fluid input aperture 93 collectively define an overlap inlet from reservoir 58 into chamber 59 through both valve member 65 and separator wall 60. As is known, during rotation of the driven member of the coupling apparatus, the shear fluid is forced radially outward with respect to common axis 20, forming a generally doughnut-shaped body of shear fluid (not shown). The depth of the shear fluid in reservoir 58 is controlled by modulating the radial position of valve aperture 91 with respect to common axis 20. By moving aperture 91 radially inward towards common axis 20, the depth of the shear fluid in reservoir 58 increases, and a correspondingly smaller proportion of the fluid remains in fluid shear chamber 59. Accordingly, less torque is transmitted between the driving member and the driven member since there is less shear fluid overlap. Conversely, as valve aperture 91 is moved radially outward from common axis 20, a greater proportion of shear fluid flows from reservoir 58 into chamber 59. Accordingly, more torque is transmitted between the driving member and the driven member, and the speed of the driven member is increased.

Radial displacement of fluid aperture 91 with respect to common axis 20 may be accomplished in a variety of ways. As illustrated in FIGS. 1-3, valve member 65 is coupled to crank driver link 71 by coupler link 77. Crank driver link 71 is affixed to valving shaft 63 which in turn is affixed to bimetal coil 95. Note that in FIG. 1, crank driver link 71, coupler link 77, and valving shaft 63 are shown as a side elevational, rather than sectional view, for drawing clarity. Bimetal coil comprises a coiled laminate of two metals, each having a different coefficient of thermal expansion. The coil is attached to cover 16. Coil 95 acts as a temperature responsive thermostat which coils or uncoils proportionate to the ambient temperature. As coil 95 coils or uncoils in response to temperature changes, it rotates valving shaft 63, in turn rotating crank driver link 71. Coupler link 77 transmits this rotational movement of driver link 71 to valve member 65. Thus, this assembly provides for rotation of valve member 65 both clockwise and counterclockwise in response to temperature changes. Accordingly, valve aperture 91 rotates about valve axis 69 in response to temperature changes, causing the proportionate distribution of shear fluid in reservoir 58 vis-a-vis fluid shear chamber 59 as a function of ambient temperature. Thus, temperature changes modulate the location of valve aperture 91, and correspondingly, the degree of coupling in the fluid shear coupling apparatus 10.

Valve axis 69 is eccentric to, and radially outward of, common axis 20. Accordingly, pivot 67, and thus the center of rotation for valve aperture 91 is eccentric to, and radially outward of, common axis 20. This eccentric positioning provides for greater radial displacement of aperture 91 with respect to common axis 20 for a given amount of rotation of valving shaft 63 than would occur if valve pivot 67 were located on common axis 20. Accordingly, the temperature responsiveness and sensitivity of the valving assembly may be enhanced. Furthermore, the sensitivity may be selectively varied by changing the position on valve member 65 and/or on crank driver link 71 where coupler link 77 is attached. In FIG. 2a, three link attachment points 79, 81 and 83 are located on crank driver link 71 at various radial locations. Similarly, three attachment points 85, 87 and 89 are located on valve member 65 at various radial locations. By changing the pivotable attachment of coupler link 77 to a selected pair of these attachment points, a change in the ratio of rotation between valve member 65 and valving shaft 63 is achieved.

Figure 2C:
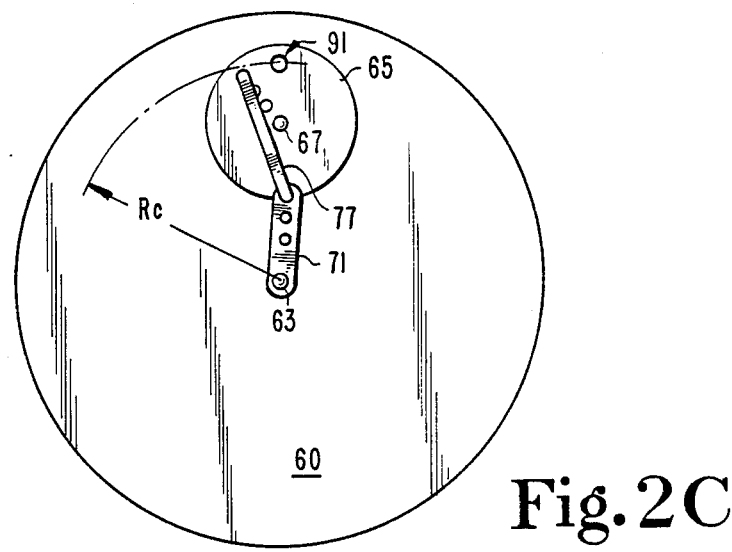
FIG. 2C is a front elevational view of a first embodiment of a separator plate assembly of the apparatus of FIG. 1, with the valve aperture in a third, radially outward position.

As illustrated in FIGS. 2a, 2b and 2c, valve aperture 91 is shown in a first, radially inward postion (having a radius $R_a$), a second, radially intermediate position (having a radius $R_b$), and a third, radially outward position (having a radius $R_c$) respectfully. Radius $R_a$ is less than radius $R_b$ which in turn is less than radius $R_c$. Thus, rotation of valve member 65 causes the actual radial position of valve aperture 91 to change with respect to common axis 20 and with respect to valving shaft 63. Furthermore, as illustrated, this is accomplished while the overlap inlet defined by valve aperture 91 and fluid input aperture 93 has a constant cross-sectional area of flow between reservoir 58 and chamber 59. By providing a constant cross-sectional area, the fluid flow rate between reservoir 58 and chamber 59 is more uniformly controlled, and the amount of operating shear fluid is controlled by the position of the overlap inlet rather than by its size.

Figure 4:
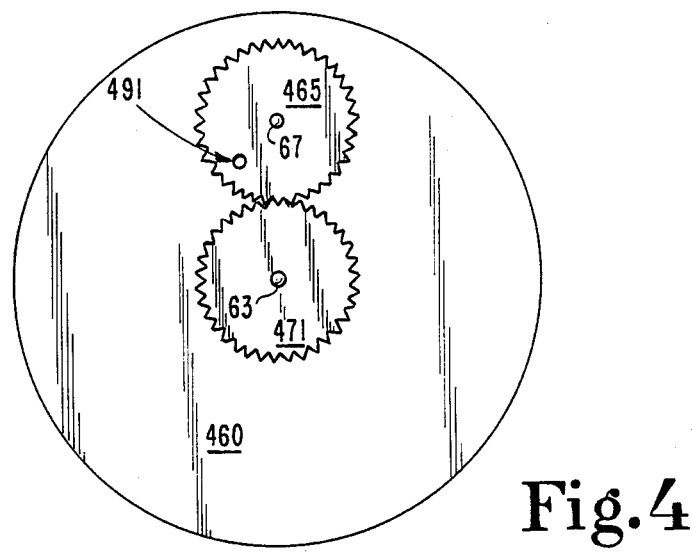
FIG. 4 is a front elevational view of a second embodiment of a separator plate assembly according to the present invention, with the valve aperture in a radially inward position.

Referring now to FIG. 4, a second embodiment of the separator plate assembly is shown. This embodiment, with separator wall 460, functions similarly to the embodiment described with respect to FIGS. 1-3 except that driver gear 471 replaces crank driver link 77 and coupler link 77 in imparting movement to the valve body. Furthermore, valve body 465 has gear teeth which engage gear teeth on driver gear 471. Valving shaft 63 imparts rotational movement to driver gear 471, which in turn imparts rotational movement to valve body 465. The radial position of valve aperture 491 modulates, as described above, the way valve aperture 91 modulates. The rotational responsiveness of valve body 465 may be varied according to design requirements by changing the diameters of, and thus gear ratios between driver gear 471 and valve body 465.

Figure 5:
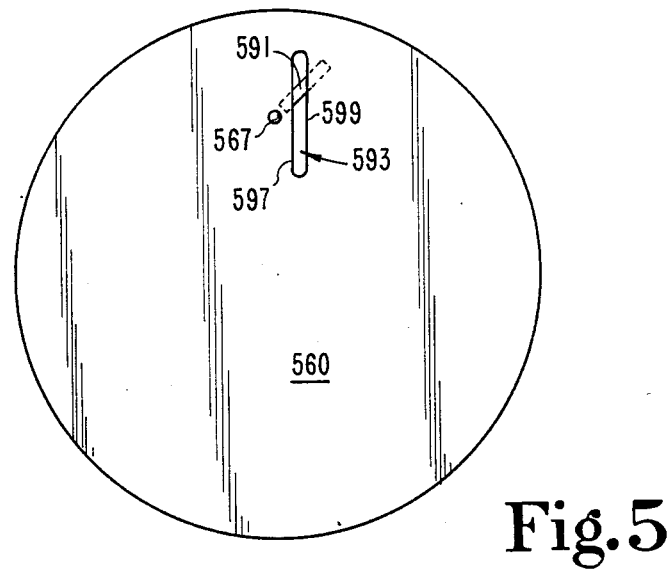
FIG. 5 is a rear elevational view of a third embodiment of a separator plate assembly according to the present invention, with the valve aperture in a radially outward position.

Referring now to FIG. 5, a third embodiment of the separator plate assembly is shown. Separator wall 560 is modified from the earlier described embodiments in that fluid inlet aperture 593 is a straight slot, rather than an arcuate slot of the earlier described embodiments. Fluid inlet aperture 593 has straight inner edge 597 and straight outer edge 599 which are parellel. Furthermore, valve aperture 591, shown partially in phantom lines, is rectangular in shape, rather than round. Accordingly, the overlap inlet defined by the overlap of fluid inlet aperture 593 and valve aperture 591 is not of a constant area during rotation of the valve member around valve pivot 567. Thus, the overlap inlet, which is diamond-shaped in FIG. 5, would reduce in total area as the valve is pivoted towards a radially intermediate position and would take on a rectangular shape. As the valve member continued to pivot to a radially inward position, the overlap inlet would increase in total area and would again take on a diamond shape.

A multiple of various geometries and sizes of fluid inlet apertures and valve apertures may be provided to achieve various valving characteristics to satisfy a particular design application. For example, the inner edge and outer edge of the fluid inlet aperture may be divergent, convergent or irregular. Although such approaches for many arrangements will not provide the constant area overlap inlet which is one aspect of the present invention, such approaches allow for design latitude, providing a controlled overlap inlet area, while employing other advantageous aspects of the present invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:
1. A fluid shear coupling apparatus comprising:
   a driving member including a rotor and a shaft connected to said rotor and adapted and configured for transmitting rotational drive from an external drive source to said rotor, said rotor having a first shear surface;
   a driven member including a second shear surface configured and positioned complementary to said first shear surface of said rotor and defining there- with a fluid shear chamber cooperable with a shear fluid received therein for transmitting torque between said driving member and said driven member;
bearing mount means for mounting said driven member to said driving member for relative rotation between said driven member and said driving member about a common axis;
a shear fluid reservoir defined by said driven member;
a separator wall between said shear fluid reservoir and said fluid shear chamber, said separator wall having a fluid input aperture communicating said shear fluid reservoir with said fluid shear chamber at a first location radially inward of said first and second complementary fluid shear surfaces;
fluid return means for returning shear fluid from said fluid shear chamber at a second location radially outward of said first and second complementary fluid shear surfaces to said shear fluid reservoir;
a movable valve member located along said separator wall over said fluid input aperture, said valve member having a valve aperture therein, said valve aperture overlapping said fluid input aperture; and
means for moving said valve member with respect to said separator wall, wherein said valve member is pivotally mounted with respect to said separator wall with said means for moving said valve member being operative to radially displace said valve aperture relative to said common axis.

2. A fluid shear coupling apparatus comprising:
a driving member including a rotor and a shaft connected to said rotor and adapted and configured for transmitting rotational drive from an external drive source to said rotor, said rotor having a first shear surface;
a driven member including a second shear surface configured and positioned complementary to said first shear surface of said rotor and defining therewith a fluid shear chamber cooperable with a shear fluid received therein for transmitting torque between said driving member and said driven member;
bearing mount means for mounting said driven member to said driving member for relative rotation between said driven member and said driving member about a common axis;
a shear fluid reservoir defined by said driven member;
a separator wall between said shear fluid reservoir and said fluid shear chamber, said separator wall having a fluid input aperture communicating said shear fluid reservoir with said fluid shear chamber at a first location radially inward of said first and second complementary fluid shear surfaces;
fluid return means for returning shear fluid from said fluid shear chamber at a second location radially outward of said first and second complementary fluid shear surfaces to said shear fluid reservoir;
a movable valve member located along said separator wall over said fluid input aperture, said valve member having a valve aperture therein, said valve aperture overlapping said fluid input aperture; and
means for moving said valve member with respect to said separator wall, wherein movement of said valve member by said means for moving radially displaces said valve aperture with respect to said common axis between a radially inward valve position and a radially outward valve position;
wherein said means for moving includes a valve member pivot on said valve member and located on a valve axis, wherein said valve member is pivotable with respect to said separator wall at said valve member pivot to move said valve aperture radially inward and outward with respect to said common axis, and wherein said valve axis is eccentric to and radially outward of said common axis of said driven member, and wherein said means for moving further includes means for variably rotating said valve member between said radially inward valve position and said radially outward valve position.

3. The fluid shear coupling apparatus of claim 2 wherein said means for variably rotating said valve member is temperature responsive, whereby the proportionate distribution of shear fluid in said shear fluid reservoir vis-a-vis said fluid shear chamber is related to temperature, thereby providing temperature modulation of the degree of coupling in the fluid shear coupling apparatus.

4. The fluid shear coupling apparatus of claim 3 wherein said fluid input aperture comprises an arcuate slot radially disposed around said valve axis.

5. The fluid shear coupling apparatus of claim 4 wherein the overlap of said valve aperture and said fluid input aperture define an overlap inlet having a constant area during rotation of said valve member around said valve axis.

6. The fluid shear coupling apparatus of claim 5 wherein said means for variably rotating said valve member includes driver gear rotatable around said common axis and in engagement with said vave member.

7. The fluid shear coupling apparatus of claim 5 wherein said means for variably rotating said valve member includes a crank driver link coupled to said valve member by a coupler link.

8. The fluid shear coupling apparatus of claim 7 wherein said coupler link is attachable to said valve member and said crank driver link at a plurality of link attachment points to selectively vary the rotational responsiveness of said valve member to said crank driver link.

9. The fluid shear coupling apparatus of claim 2 wherein said fluid input aperture comprises an arcuate slot radially disposed around said valve axis.

10. The fluid shear coupling apparatus of claim 2 wherein the overlap of said valve aperture and said fluid input aperture define an overlap inlet having a constant area during rotation of said valve member around said valve axis.

11. The fluid shear coupling apparatus of claim 2 wherein said means for variably rotating said valve member includes driver gear rotatable around said common axis and in engagement with said valve member.

12. The fluid shear coupling apparatus of claim 2 wherein said means for variably rotating said valve member includes a crank driver link coupled to said valve member by a coupler link.

13. The fluid shear coupling apparatus of claim 12 wherein said coupler link is attachable to said valve member and said crank driver link at a plurality of link attachment points to selectively vary the rotational responsiveness of said valve member to said crank driver link.

14. A fluid shear coupling apparatus comprising:
a driving member including a rotor and a shaft connected to said rotor and adapted and configured for transmitting rotational drive from an external drive source to said rotor, said rotor having a first shear surface;

a driven member including a second shear surface configured and positioned complementary to said first shear surface of said rotor and defining therewith a fluid shear chamber cooperable with a shear fluid received therein for transmitting torque between said driving member and said driven member;

bearing mount means for mounting said driven member to said driving member for relative rotation between said driven member and said driving member about a common axis;

a shear fluid reservoir defined by said driven member;

a separator wall between said shear fluid reservoir and said fluid shear chamber, said separator wall having a fluid input aperture communicating said shear fluid reservoir with said fluid shear chamber at a first location radially inward of said first and second complementary fluid shear surfaces, said fluid input aperture comprising an arcuate slot having an arcuate inner edge and an arcuate outer edge;

fluid return means for returning shear fluid from said fluid shear chamber at a second location radially outward of said first and second complementary fluid shear surfaces to said shear fluid reservoir;

a rotatable valve member located along said separator wall over said fluid input aperture, said valve member having a valve aperture therein, said valve aperture overlapping said fluid input aperture;

a valve member pivot on said valve member and located on a valve axis, wherein said valve member is pivotable with respect to said separator wall at said valve member pivot to move said valve aperture along said fluid input aperture radially inward and outward with respect to said common axis, wherein the overlap of said valve aperture and said fluid input aperture define an overlap inlet having a constant area during rotation of said valve member around said valve axis; and means for variably rotating said valve member between a radially inward valve position and a radially outward valve position.

15. The fluid shear coupling apparatus of claim 14 wherein said means for variably rotating said valve member is temperature responsive, whereby the proportionate distribution of shear fluid in said shear fluid reservoir vis-a-vis said fluid shear chamber is related to temperature, thereby providing temperature modulation of the degree of coupling in the fluid shear coupling apparatus.

16. The fluid shear coupling apparatus of claim 15 wherein said means for variably rotating said valve member includes driver gear rotatable around said common axis and in engagement with said valve member.

17. The fluid shear coupling apparatus claim 15 wherein said means for variably rotating said valve member includes a crank driver link coupled to said valve member by a coupler link.

18. The fluid shear coupling apparatus of claim 17 wherein said coupler link is attachable to said valve member and said crank driver link at a plurality of link attachment points to selectively vary the rotational responsiveness of said valve member to said crank driver link.

19. The fluid shear coupling apparatus of claim 15 wherein said valve axis is eccentric to, and radially outward of, said common axis of said driven member.

20. The fluid shear coupling apparatus of claim 14 wherein said means for variably rotating said valve member includes driver gear rotatable around said common axis and in engagement with said valve member.

21. The fluid shear coupling apparatus of claim 14 wherein said means for variably rotating said valve member includes a crank driver link coupled to said valve member by a coupler link.

22. The fluid shear coupling apparatus of claim 21 wherein said coupler link is attachable to said valve member and said crank driver link at a plurality of link attachment points to selectively vary the rotational responsiveness of said valve member to said crank driver link.

23. The fluid shear coupling apparatus of claim 14 wherein said valve axis is eccentric to, and radially outward of, said common axis of said driven member.

24. A fluid shear coupling apparatus comprising:
a driving member including a rotor and a shaft connected to said rotor and adapted and configured for transmitting rotational drive from an external drive source to said rotor, said rotor having a first shear surface;

a driven member including a second shear surface configured and positioned complementary to said first shear surface of said rotor and defining therewith a fluid shear chamber cooperable with a shear fluid received therein for transmitting torque between said driving member and said driven member;

bearing mount means for mounting said driven member to said driving member for relative rotation between said driven member and said driving member about a common axis;

a shear fluid reservoir defined by said driven member;

a separator wall between said shear fluid reservoir and said fluid shear chamber, said separator wall having a fluid input aperture communicating said shear fluid reservoir with said fluid shear chamber at a first location radially inward of said first and second complementary fluid shear surfaces, said fluid input aperture comprising an arcuate slot having an arcuate inner edge and an arcuate outer edge;

fluid return means for returning shear fluid from said fluid shear chamber at a second location radially outward of said first and second complementary fluid shear surfaces to said shear fluid reservoir;

a rotatable valve member located along said separator wall over said fluid input aperture, said valve member having a valve aperture therein, said valve aperture overlapping said fluid input aperture;

a valve member pivot on said valve member and located on a valve axis, wherein said valve member is pivotable with respect to said separator wall at said valve member pivot to move said valve aperture along said fluid input aperture radially inward and outward with respect to said common axis, wherein said valve axis defines a common radial center for said arcuate inner edge and said arcuate outer edge of said fluid input aperture, wherein the overlap of said valve aperture and said fluid input aperture define an overlap inlet having a constant area during rotation of said valve member around said valve axis; and means for variably rotating said valve member between a radially inward valve position and a radially outward valve position.

25. A fluid shear coupling apparatus comprising:

a driving member including a rotor and a shaft connected to said rotor and adapted and configured for transmitting rotational drive from an external drive source to said rotor, said rotor having a first shear surface;

a driven member including a second shear surface configured and positioned complementary to said first shear surface of said rotor and defining therewith a fluid shear chamber cooperable with a shear fluid received therein for transmitting torque between said driving member and said driven member;

bearing mount means for mounting said driven member to said driving member for relative rotation between said driven member and said driving member about a common axis;

a shear fluid reservoir defined by said driven member;

a separator wall between said shear fluid reservoir and said fluid shear chamber, said separator wall having a fluid input aperture communicating said shear fluid reservoir with said fluid shear chamber at a first location radially inward of said first and second complementary fluid shear surfaces;

fluid return means for returning shear fluid from said fluid shear chamber at a second location radially outward of said first and second complementary fluid shear surfaces to said shear fluid reservoir;

a moveable valve member located along said separator wall over said fluid input aperture, said valve member having a valve aperture therein, said valve aperture overlapping said fluid input aperture;

means for moving said valve member with respect to said separator wall, wherein movement of said valve member by said means for moving radially displaces said valve aperture with respect to said common axis between a radially inward valve position and a radially outward valve position; and wherein the overlap of said valve aperture and said fluid input aperture define an overlap inlet having a generally constant area during movement of said valve member to provide radial displacement of said constant area overlap inlet.

* * * * *

UNITED STATES PATENT AND TRADEMARK OFFICE
CERTIFICATE OF CORRECTION

PATENT NO.    : 4,913,273
DATED         : April 3, 1990
INVENTOR(S)   : Gerald E. Mader It is certified that error appears in the above-identified patent and that said Letters Patent is hereby corrected as shown below:

At column 1, line 61, "arrangment" should read --arrangement--.

At column 2, line 34, following the word "fluid", please insert the word --input--.

At column 10, line 33, "vave" should read "valve".

At column 11, line 59, following the word "apparatus", please insert the word "of".

Signed and Sealed this

Seventh Day of May, 1991

*Attest:*

HARRY F. MANBECK, JR.

*Attesting Officer*      *Commissioner of Patents and Trademarks*